United States Patent
Styn

(10) Patent No.: US 11,007,909 B2
(45) Date of Patent: May 18, 2021

(54) SEAT AND SEAT TRIM STRUCTURE FOR A VEHICLE AND VEHICLE HAVING SAME

(71) Applicant: Honda Motor Co., Ltd., Tokyo (JP)

(72) Inventor: Christopher Styn, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/538,271

(22) Filed: Aug. 12, 2019

(65) Prior Publication Data

US 2020/0055427 A1 Feb. 20, 2020

Related U.S. Application Data

(60) Provisional application No. 62/718,784, filed on Aug. 14, 2018.

(51) Int. Cl.
- *B60N 2/28* (2006.01)
- *B60N 2/58* (2006.01)
- *B60N 2/68* (2006.01)

(52) U.S. Cl.
CPC ......... *B60N 2/2893* (2013.01); *B60N 2/5883* (2013.01); *B60N 2/68* (2013.01)

(58) Field of Classification Search
CPC .... B60N 2/2893; B60N 2/2887; B60N 2/289; B60N 2/286; B60N 2/5883; B60N 2/68; B60N 2/58; B60N 2/60
USPC ........... 297/218.1, 253, 228.13, 188.2, 219.1
See application file for complete search history.

(56) References Cited

U.S. PATENT DOCUMENTS

| | | | |
|---|---|---|---|
| 6,416,128 B1 | 7/2002 | Fujii | |
| 7,093,896 B2 * | 8/2006 | Morita | B60N 2/2821 297/253 |
| 7,281,763 B1 * | 10/2007 | Hayashi | B60N 2/2893 297/253 |
| 7,427,103 B2 | 9/2008 | Weber | |
| 7,758,096 B2 | 7/2010 | Ohta | |
| 9,493,099 B2 | 11/2016 | Ruthinowski | |
| 9,604,555 B2 | 3/2017 | Fujikake et al. | |
| 9,981,581 B2 * | 5/2018 | Okuhara | B60N 2/58 |
| 2002/0104190 A1 | 8/2002 | Moore et al. | |

(Continued)

FOREIGN PATENT DOCUMENTS

| | | |
|---|---|---|
| DE | 10044621 C1 | 2/2002 |
| DE | 102006019738 A1 | 10/2007 |

(Continued)

*Primary Examiner* — Mark R Wendell
(74) *Attorney, Agent, or Firm* — Kenealy Vaidya LLP

(57) ABSTRACT

A vehicle seat and seat structure for use with an ISOFIX bar is disclosed. The vehicle seat can include a bottom portion, a back portion, a trim portion located between the bottom portion and the back portion, and left and right ISOFIX bars located at the trim portion. A trim cover, made from a flexible material such as a carpet, fabric, or other known vehicle interior material, can extend from a left side of the seat to a right side of the seat and can include left and right openings configured to allow the ISOFIX bars to pass therethrough. A one-piece integrally molded member can be overmolded onto the flexible material trim cover, and can include left and right pocket indents. The left and right pocket indents can each include a slot configured to allow a respective ISOFIX bar to pass therethrough.

20 Claims, 7 Drawing Sheets

(56) References Cited

U.S. PATENT DOCUMENTS

2017/0355283 A1* 12/2017 Shindo ................. B60N 2/2887
2018/0111528 A1* 4/2018 Okuhara .............. B60N 2/5628

FOREIGN PATENT DOCUMENTS

DE  102009036726 A1  2/2011
FR       2975643 A1  11/2012
JP      2001122004 A  5/2001

* cited by examiner

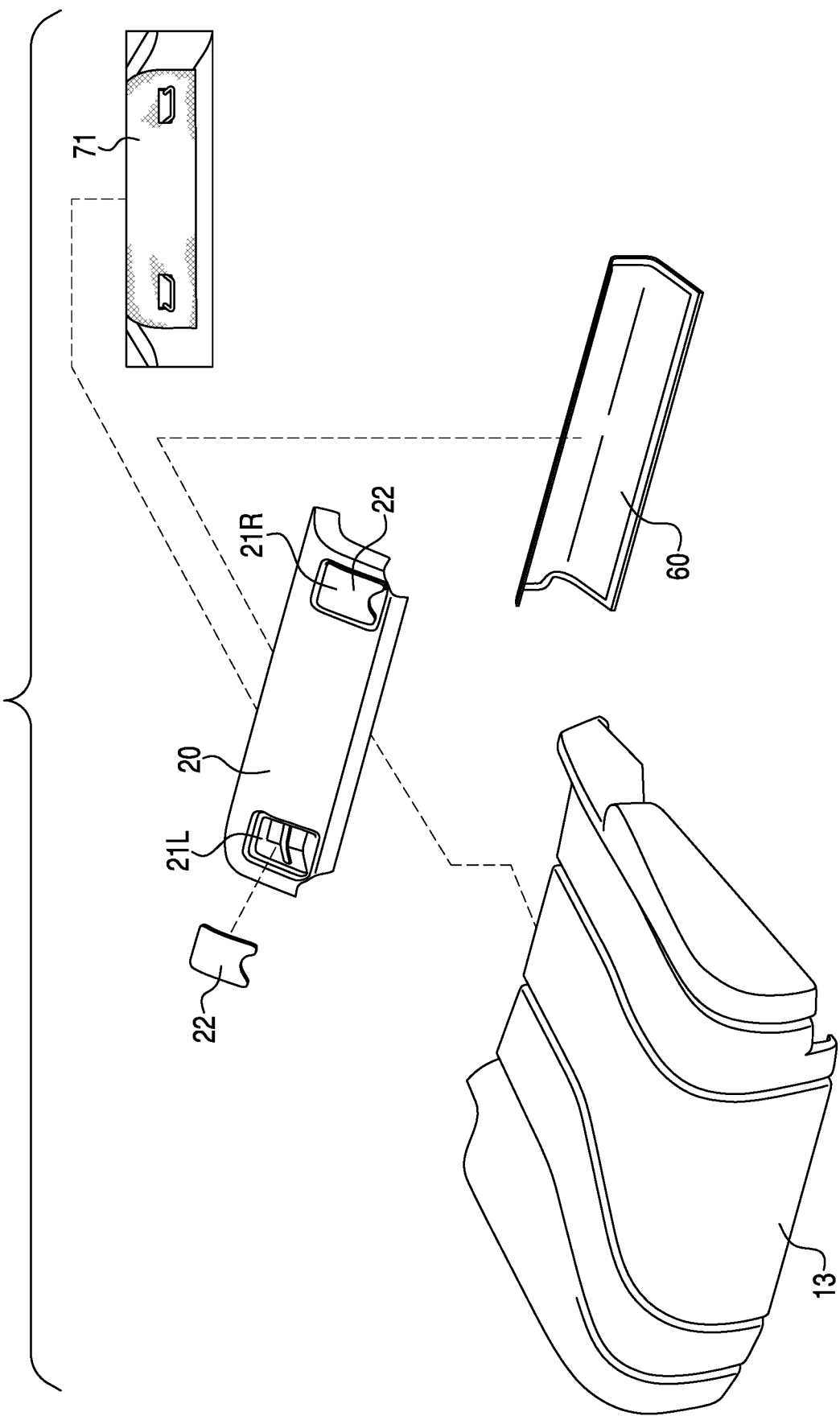

SEAT AND SEAT TRIM STRUCTURE FOR A VEHICLE AND VEHICLE HAVING SAME

RELATED CASES

This application claims the priority benefit under 35 U.S.C. § 119 of U.S. Provisional Patent Application No. 62/718,784 filed on Aug. 14, 2018. The disclosure in U.S. Provisional Patent Application No. 62/718,784 is hereby incorporated in its entirety by reference.

BACKGROUND

The disclosed subject matter relates to a vehicle seat, seat trim cover, and a vehicle incorporating the same, as well as methods for use and manufacture thereof. More particularly, the disclosed subject matter relates to methods and apparatus related to placement and configuration of various seat components relative to an ISOFIX child restraint system.

ISOFIX is the international standard for attachment points for child safety seats in a passenger vehicle. The system has other regional names including LATCH ("Lower Anchors and Tethers for Children") and LUAS ("Lower Universal Anchorage System") or Canfix in Canada. It has also been called the "Universal Child Safety Seat System" or UCSSS.

ISOFIX is the International Organisation for Standardisation standard ISO 13216, which specifies the anchoring system for Group 1 child safety seats. The standard defines attachment points to be manufactured into vehicles, enabling compliant child safety seats to be quickly and safely secured to a vehicle seat. Use of ISOFIX structures to attach a child seat is an alternative to securing the child seat with seat belts. When using the ISOFIX structures, the child seat is secured with a single attachment at the top and two attachments at the base of each side of the child seat. The top attachment can be configured as a tether extending from the top of the child seat to a bar or loop like connection point located at a top of the vehicle seat. The two attachments at the base of each side of the child seat can be configured as two locking connection structures located in the base of the child seat that are configured to connect with and lock onto loop-like bar or wire structures (the ISOFIX bar structures) located in the hinge or trim cover area between the vehicle seat back and the vehicle seat bottom. Thus, with respect to the vehicle, the ISOFIX system includes a top bar/loop and two seat bar/loop anchor structures for attaching to a child seat. The center-to-center distance between the two seat anchors of ISOFIX (and also LATCH) systems is 280 mm.

There exists a long felt need to properly, economically, and aesthetically store or conceal the ISOFIX attachment structures when not in use, while providing easy access to the ISOFIX structures when desired, and achieving an efficient and cost effective manufacturing method for manufacturing vehicle seats that incorporate ISOFIX structures. Many attempts to store the ISOFIX structures have included the use of additional padded trim cover pillows and use of oversized seat backs or seat bottoms.

SUMMARY

In view of the problems and challenges existing in the related art vehicle frames, some embodiments of the presently disclosed subject matter include a vehicle seat trim cover for use with a vehicle seat that includes a vehicle seat bottom portion, a vehicle seat back portion, a trim cover portion located between the vehicle seat bottom portion and the vehicle seat back portion, and a left ISOFIX bar and a right ISOFIX bar located at the trim cover portion. The vehicle seat trim cover can include a flexible material trim cover configured to extend from a left side of the vehicle seat to a right side of the vehicle seat, the flexible material trim cover including a left opening configured to be located at a left side of the vehicle seat and a right opening configured to be located at a right side of the vehicle seat. The left side opening can be configured to allow the left ISOFIX bar to pass therethrough and the right side opening can be configured to allow the right ISOFIX bar to pass therethrough. A one-piece integrally molded member integrally can be overmolded onto the flexible material trim cover and can include a left pocket indent located at the left opening of the flexible material trim cover and a right pocket indent located at the right opening of the flexible material trim cover. The left pocket indent can include a slot configured to allow the left ISOFIX bar to pass therethrough and the right pocket indent can include a slot configured to allow the right ISOFIX bar to pass therethrough.

According to another aspect of the disclosed subject matter, some embodiments are directed to a vehicle seat trim cover for use with a vehicle. The vehicle seat can include a vehicle seat bottom portion, a vehicle seat back portion, a trim cover portion located between the vehicle seat bottom portion and the vehicle seat back portion, and a left ISOFIX bar and a right ISOFIX bar located at the trim cover portion. The trim cover portion can include a flexible material trim cover extending from a left side of the vehicle seat to a right side of the vehicle seat. The flexible material trim cover can include a left opening located at a left side of the vehicle seat trim cover portion and a right opening located at a right side of the vehicle seat trim cover portion, the left opening including the left ISOFIX bar passing therethrough and the right opening including the right ISOFIX bar passing therethrough. A one-piece integrally molded member can be connected to the flexible material trim cover. The integrally molded member can include a left pocket indent located at the left opening of the flexible material trim cover and a right pocket indent located at the right opening of the flexible material trim cover. The left pocket indent can include a slot through which the left ISOFIX bar passes and the right pocket indent can include a slot through which the right ISOFIX bar passes.

According to another aspect of the disclosed subject matter, some embodiments are directed to a vehicle seat trim cover for use with a vehicle that includes a vehicle seat bottom portion and a vehicle seat back portion. The vehicle seat trim cover can include a left ISOFIX bar and a right ISOFIX bar, a flexible material trim cover extending from the left ISOFIX bar to the right ISOFIX bar and including a left side opening through which the left ISOFIX bar passes and a right side opening through which the right ISOFIX bar passes, and a rigid cover member connected to the flexible material trim cover. The rigid cover member can include a left concave portion located at one end of the rigid cover member and a right concave portion located at an opposite end of the rigid cover member, and a planar face extending between the left concave portion and right concave portion and along a longitudinal axis of the rigid cover member. The planar face can include a front surface and an opposed rear surface, the left concave portion extending away from the rear surface of the rigid cover member and located at the left opening of the flexible material trim cover, and the right concave portion extending away from the rear surface of the rigid cover member and located at the right opening of the flexible material trim cover. The left concave portion can include an opening through which the left ISOFIX bar passes and the right concave portion can include an opening through which the right ISOFIX bar passes.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 4 is an exploded view of the vehicle seat of FIG. 1.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Various vehicular seat design factors may make it challenging to sufficiently and efficiently conceal or stow the ISOFIX wire or bar located at the trim cover portion of the vehicle seat. It may therefore be beneficial to provide a vehicle seat and a trim cover for the vehicle seat with an apparatus or structure that addresses at least one of the above and/or other challenges of related art vehicle seats. In particular, it may be beneficial to include a cover member for the trim portion of a vehicle seat that is planar (i.e., substantially located within a single plane), with the planar surface facing frontwards towards a user of the seat. The cover member can include two openings (left and right) for storing the ISOFIX bars therein, along with left and right cover caps that are attachable directly to the ISOFIX bars and which, when connected to the ISOFIX bars, mate with the cover member to present a uniform front surface at the vehicle seat trim cover portion.

The disclosed subject matter includes a cover system for an ISOFIX bar/wire on a vehicle seat (e.g., for attachment of a child seat). The system can include a molded base (e.g., laminated thermoplastic polyurethane over formed carpet) adjacent the juncture between bottom and back portions of the vehicle seat. The molded base can define recessed pocket or concave areas at opposite ends of the molded base for receipt of attachment members (e.g., for a child seat, not shown). An ISOFIX bar/wire can extend into each of the recessed areas from a rearward side of the molded base through slotted openings in the pocket.

The system can further include a cover or cap for covering/concealing the recessed area when the ISOFIX wire is not being used. The cover includes a generally rectangular plate portion and retention elements extending from a rearward side of the plate portion. The retention elements can be configured to engage the ISOFIX wire in a snap-fit manner when the plate portion of the cover is in a substantially flush condition with the forward surface of the molded base.

Figure 1:
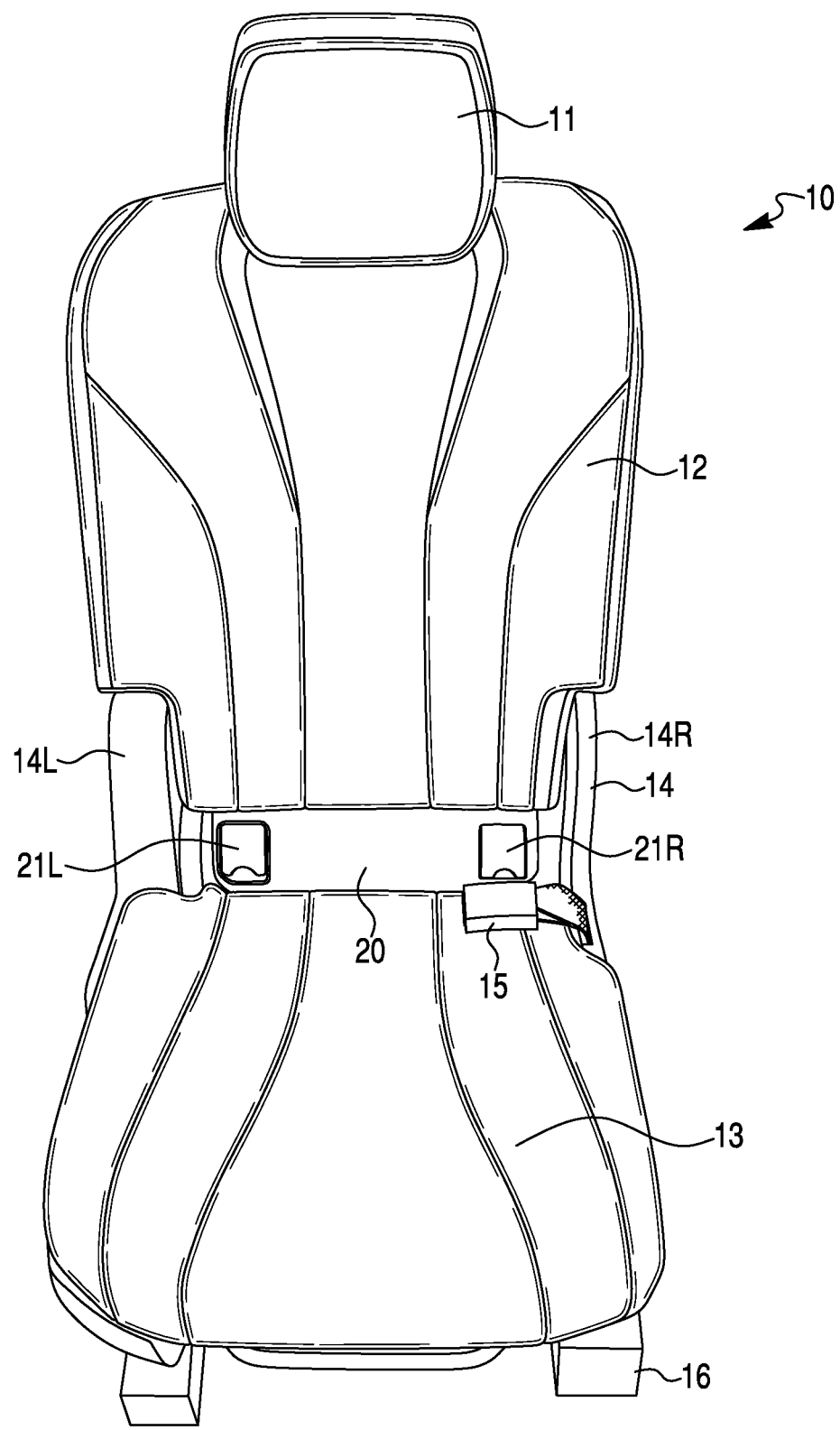
FIG. 1 is a perspective view of a vehicle seat made in accordance with principles of the disclosed subject matter.

FIG. 1 is a perspective view of an exemplary vehicle seat 10 that includes a headrest 11, a seat back 12 and a seat bottom 13. A seat connection structure 14 can include a left joint structure 14L and a right joint structure 14R that are each configured to allow the seat back 12 to rotate relative to the seat bottom 13.

The vehicle seat 10 can be connected to a frame of the vehicle via connection structures 16 located on the seat bottom 13. The seat connection structure 14 can include a trim cover member 20 that acts as a garnish or escutcheon to cover the inner structure of the seat back and bottom joint and ISOFIX structures located between the seat back 12 and seat bottom 13. A left side window or opening 21L and a right side window or opening 21R can be located at opposite ends of a longitudinal axis of the cover member 20. A seat belt latch 15 can also be provided at the seat back and bottom joint portion of the vehicle seat 10.

Figure 2:
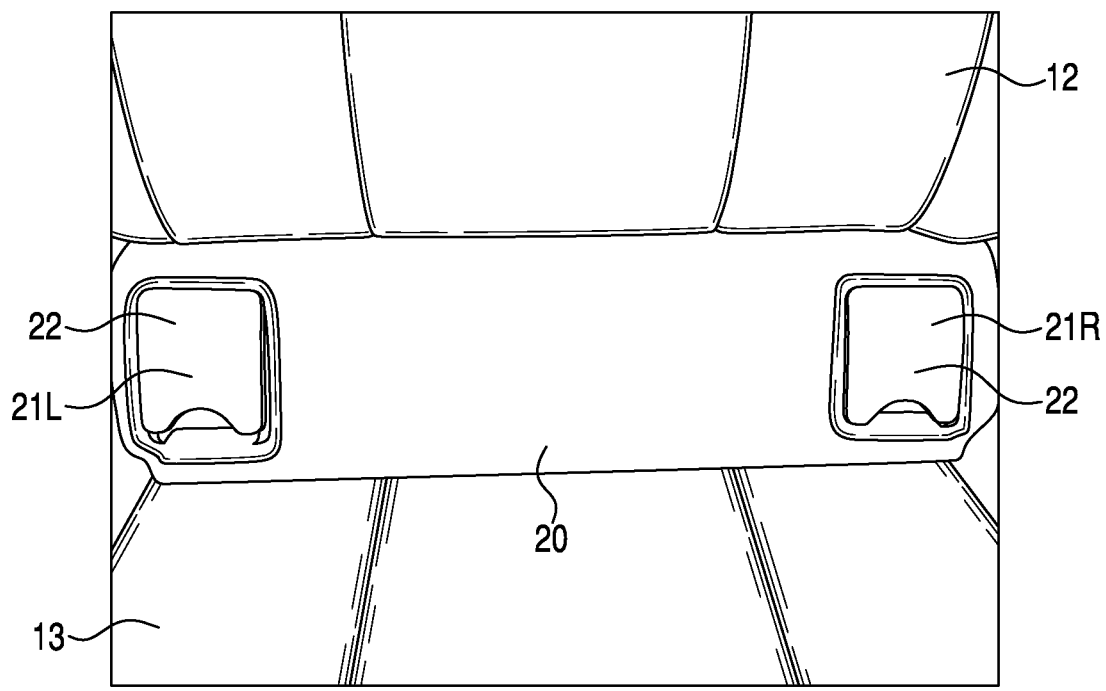
FIG. 2 is perspective view of a trim cover portion of the vehicle seat of FIG. 1.

FIG. 2 shows a close up of the vehicle seat connection structure 14 and cover member 20. As can be seen in this view, a cap 22 can be provided to cover each of the left side window 21L and right side window 21R. Each of the caps 22 can be configured to rest on an annular rim that surrounds each opening/window 21L, 21R such that the cap 22 has a front surface that is coplanar with the front surface of the cover member 20.

Figure 3A:
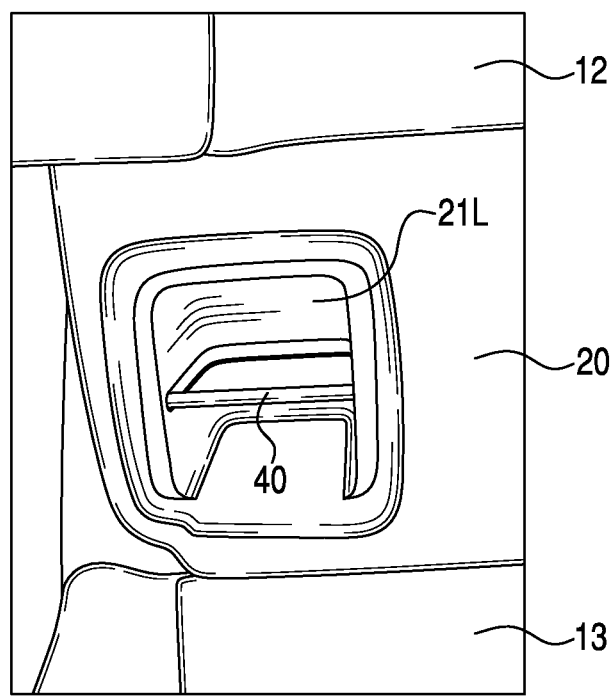
FIG. 3A is another perspective view of a trim cover portion of the vehicle seat of FIG. 1 with an ISOFIX bar exposed.

FIG. 3A shows the cover member 20 with the cap 22 removed from the left side window/opening 21L. The left side window 21L can be formed as a pocket in the cover member 20 that extends downward into the connection structure 14 (downward away from a front surface of the cover member 20). The front surface of the cover member can be planar, which is considered to be a surface located substantially within a single plane, or a surface having a smooth outward appearance that can be flat or continuously curved or combinations thereof. The pocket in the cover member 20 can include a slot 28 (see FIG. 5A) in which the ISOFIX bar 40 passes through. Thus, when the cap 22 is removed, a child seat locking structure can be affixed to the ISOFIX bar 40 to attach the child seat to the vehicle seat 10. The right side window or opening 21R can be configured in an exact same manner (or different manner) as the opening 21L described above, depending on the particular application for the vehicle seat 10.

Figure 3B:
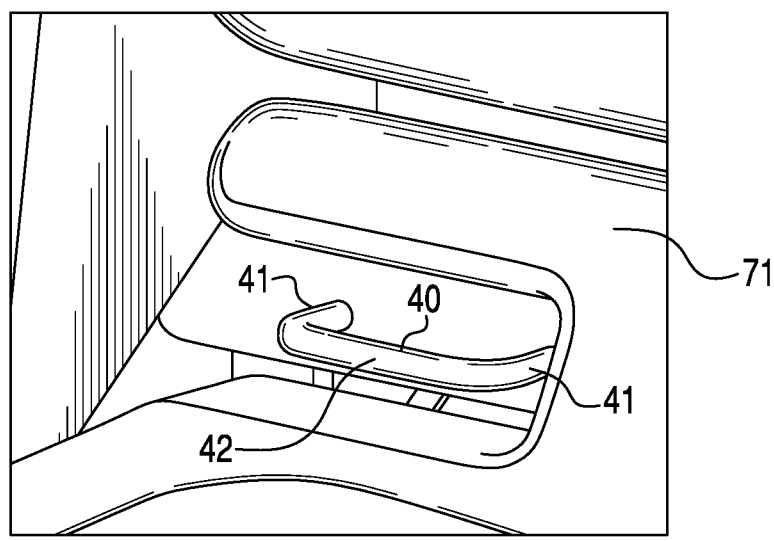
FIG. 3B is another perspective view of a trim cover portion of the vehicle seat of FIG. 1 with ISOFIX bar and seat trim cover components exposed.

FIG. 3B shows the vehicle connection structure 14 with both the cover member 20 and caps 22 removed. In this figure, a flexible material 71 is shown covering the internal components of the connection structure 14. The flexible material 71 can be a carpet, a fabric, as well as various other flexible membrane materials. The ISOFIX bar 40 (also referred to as an ISOFIX wire) can include two parallel arms 41 that are attached to the vehicle frame at their base, and are connected together by a connection portion 42 that spans across the top of the arms 41 to form a loop structure to which a child seat can be connected or anchored. The left and right side ISOFIX bars can be identical or differently shaped, depending on particular application or design preference.

The ISOFIX bars 40 and other structural elements of the connection structure 14 can be formed by any appropriate process, such as but not limited to rolling, hydroforming, bending, welding, extruding, stamping, any combination of these processes, etc. Each structural element of the connection structure 14 (including the ISOFIX bars 40) can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of connection structure 14 (and ISOFIX bars 40) can be connected to each adjoining structural element in any appropriate manner, such as but not limited to mechanical fasteners, welding, adhesive, any combination thereof, etc.

FIG. 4 is an exploded view of an exemplary vehicle connection structure 14 that includes a seat bottom 13 located adjacent the cover member 20. The cover member 20 can be configured to connect to a trim cover back shell 60 to form a space in which the ISOFIX bars 40 and other internal seat components can be located, such as hinge structures, safety belt attachment structures, etc. In addition, the cover member 20 can be attached to the shown structures in various ways. For example, the cover member 20 can be laminated onto flexible material 71, while being sewn to the seat cover 73 (see FIG. 8) of the vehicle seat 13. The seat cover 73 can be configured to cover the entire seat 13 and face outwardly toward the user or can be an integral component located within the seat 13 for anchoring the trim cover member 20. Likewise, the cover member 20 can be sewn or otherwise attached to a portion of the seat back 12 if desired. However, in the shown embodiment, the cover member 20 is not attached and is distinct from the seat back 12 and its components.

Figure 5A:
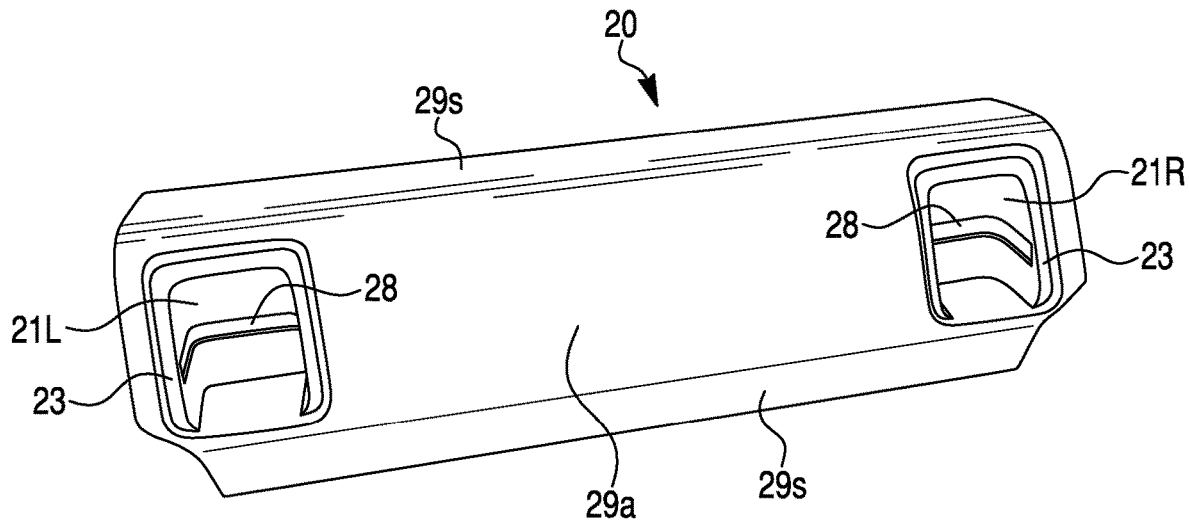
FIG. 5A is a front perspective view of an ISOFIX escutcheon/garnish base cover.
Figure 5B:
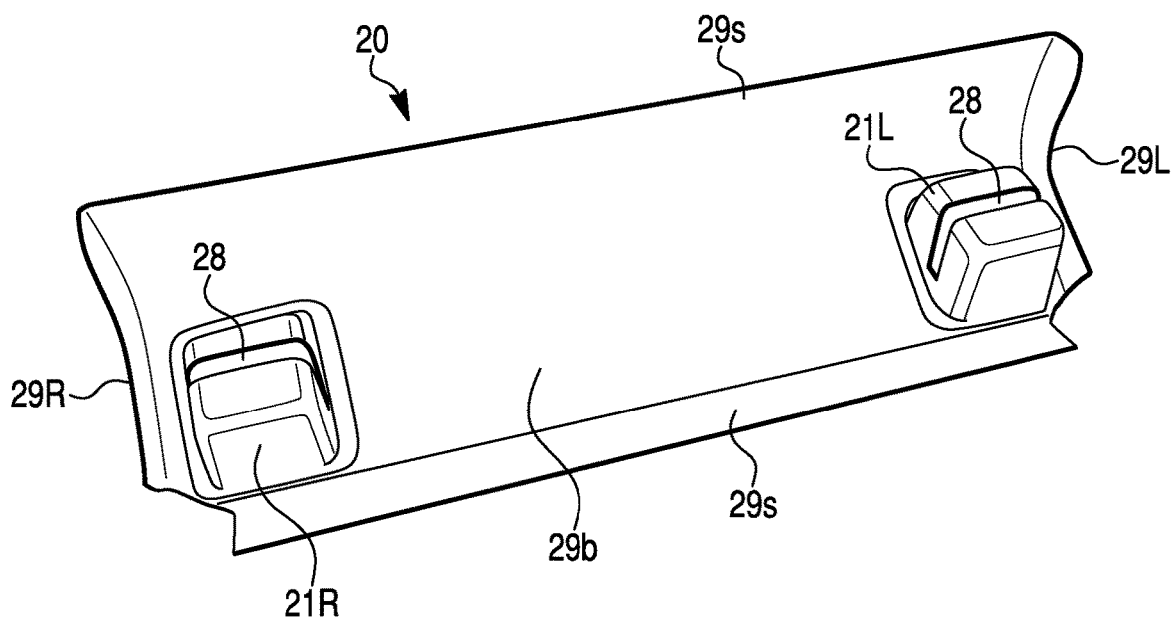
FIG. 5B is a rear perspective view of an ISOFIX escutcheon/garnish base cover.

FIGS. 5A and 5B show front and rear perspective views of the cover member 20. The ISOFIX bar openings 21L, 21R can be formed as pockets that extend into a front surface 29*a* of the cover member 20. In other words, the openings 21L, 21R can be formed as pockets that extend away from a rear surface 29*b* of the cover member 20. The openings 21L, 21R can be formed as rectangular or cube-like structures that form pockets in the cover member 20. The pockets can include an opening 28, for example a slot, through which the ISOFIX bar 40 extends when assembled. Thus, the ISOFIX bar 40 can be viewed from a front surface of the cover member 20 (see, for example, FIG. 3A), and a child seat can be easily affixed to the ISOFIX bar 40 though the openings 21L, 21R. The cover member 20 can include side surfaces 29*s* along a top and bottom periphery of the cover member that extend into the vehicle seat 10 when assembled. Likewise, left and right sides 29L, 29R of the cover member 20 can extend into the vehicle seat 10 from either longitudinal end of the cover member 20 such that the cover member 20 is provided a finished appearance when assembled on the seat 10. An annular rim 23 can be provided on the cover member 20 to surround each of the openings 21L, 21R. The cap (see FIGS. 2 and 6) can rest on the annular rim 23 to provide the front surface 29*a* of the cover member 20 a smooth and planar surface finish facing towards a user of the seat when the caps 22 are secured over the openings 21L, 21R (when a child seat is not attached to the ISOFIX bars 40.

Figure 6:
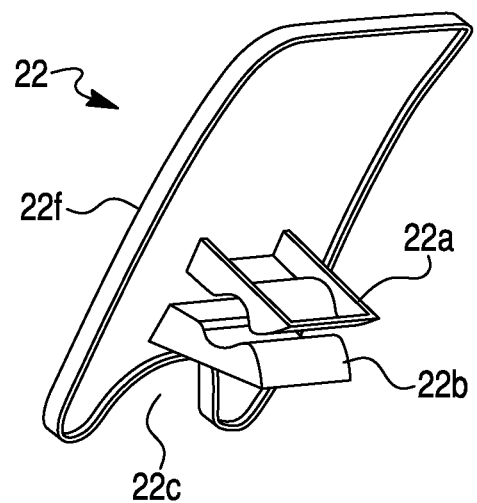
FIG. 6 is a rear perspective view of an ISOFIX cap.
Figure 7:
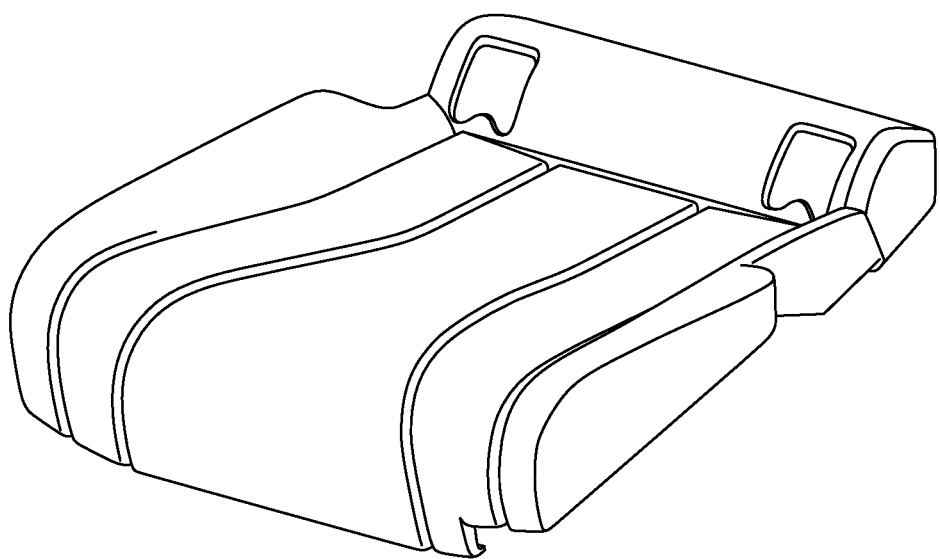
FIG. 7 is a front perspective view of a seat and trim cover portion of the vehicle seat of FIG. 1.

FIG. 6 shows a detailed rear perspective view of one of the caps 22. The cap 22 can include an attachment structure located on a rear surface of the cap 22. For example, the attachment structure can be configured as two spring arms 22*a*, 22*b* that have an indent therein for receiving and snap connecting to the ISOFIX bar 40. The spring arms 22*a*, 22*b* can be spaced apart from each other a distance that is less than a width of the ISOFIX bar 40 to be attached thereto. Thus, attachment of the cap 22 to the ISOFIX bar 40 requires some force to be exerted to move the arms 22*a*, 22*b* away from each other against their return spring force. Once the ISOFIX bar reaches the indents in the arms 22*a*, 22*b*, the arms 22*a*, 22*b* can spring back towards each other to lock the ISOFIX bar 40 therebetween. A cutaway 22*c* can be provided in the cap 22 to provide an easy access for pulling the cap 22 off of the cover member 20 and out of engagement with the ISOFIX bar 40. When attached to the ISOFIX bar 40, the front surface 22*f* of the cap 22 can be coplanar with the front surface 29*a* of the cover member.

Figure 8:
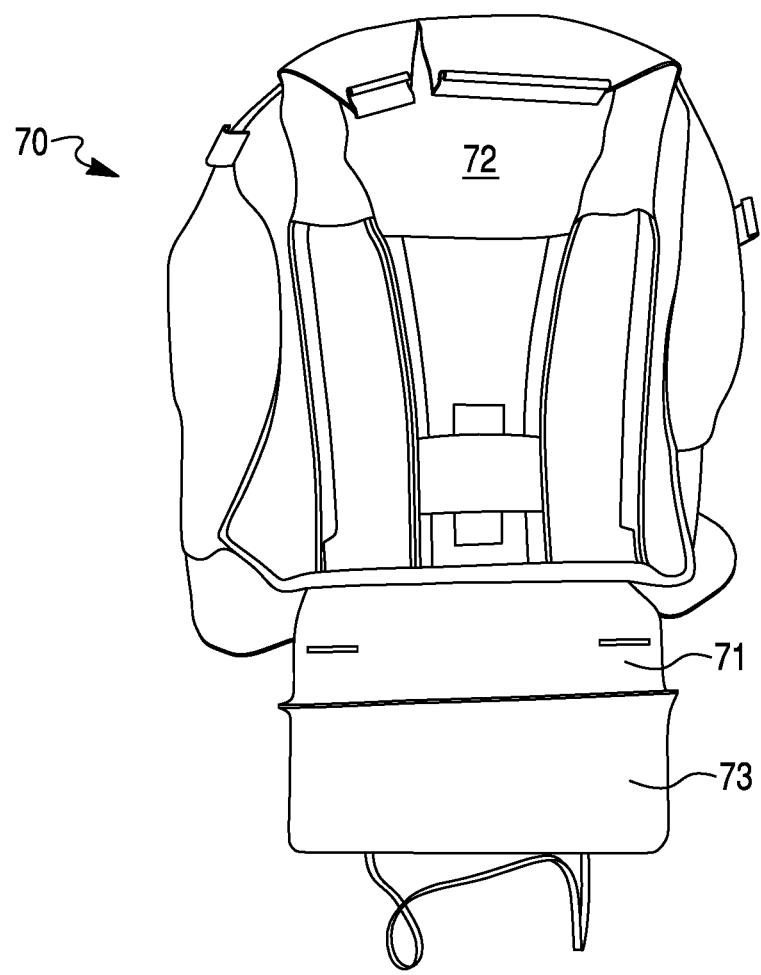
FIG. 8 is a front perspective view of seat fabric components of the vehicle seat of FIG. 1.

FIG. 8 shows an exemplary flexible material seat backing 70 that is constructed in accordance with principles of the disclosed subject matter. The flexible material seat backing 70 can include a seat portion 73 connected to the flexible material trim backing 71 which, in turn, is connected to a flexible material back portion 72. Any of these portions can include padding stitched therein or otherwise connected thereto. The portions 71-73 can be sewn together, glued together, welded together, or even separate from each other prior to assembly on the vehicle seat 10.

While certain embodiments of the invention are described above, and FIGS. 1-8 disclose a best mode for practicing the various inventive aspects, it should be understood that the invention can be embodied and configured in many different ways without departing from the spirit and scope of the invention.

For example, the ISOFIX wire/bar can be solid or hollow bars (tubes), or other elongate structures such as rebar type materials, and can be made from various materials including metals, plastics, ceramics, carbon fibers, paper and composites of these materials.

It should be noted that throughout the drawings, that if a left side component is shown in an alternate view, it can be assumed that the corresponding right side component can be similarly or exactly configured in mirror fashion. For example, the right opening 21R can be a mirror copy of left opening 21L and can include the same openings and attachment or cap components.

The pocket indents or openings 21L, 21R are shown, in one exemplary embodiment, as substantially rectangular or cup-shaped indents extending into the front surface 29*a* of the cover member 20. However, the openings 21L, 21R can be differently shaped, and can be bowl shaped indents (semispherically shaped), can be non-symmetrically shaped indents, other polygonal shaped indents, and can have different annular rim shapes as compared to the depicted shape. Likewise, the cap 22 can be differently shaped and can cover the indents or openings 21L, 21R in various ways that would provide aesthetically pleasing appearance. For example, the caps 22 can be circular, non-symmetrical, polygonal or other shapes. The caps 22 can be made from mesh like material, wires, plastic, metal, wood, ceramic, or other known materials.

The cover member 20 can be overmolded to the flexible material backing 71 in various manners, including via heat lamination, cold lamination, adhesive placement, or even placement with separate attachment or locking together via adhesive, welding, fasteners or other known attachment devices, materials, and methods. Further, the cover member 20 can be vacuum overmolded to the flexible material backing 71 with or without simultaneous heating (or heat assist).

In addition, the attachment or lock structure can be configured in various manners (as compared to arms 22*a*, 22b) and remain within the scope of the presently disclosed subject matter. For example, magnets can be used to connect the cap 22 to the cover member 20 and/or the ISOFIX bar 40. The magnets can extend from a central portion of the rear surface of the cap 22 or can be located at a periphery of the cap 22 for connection to a mating magnet surface on the annular rim 23 (or other structure) of the cover member 20. Alternatively, a ratchet hook can be used as the lock structure and can ratchet onto the ISOFIX bar for connection of the cap 22 thereto. The lock structure can also be formed as a latch that can be moved from a front of the cap 22 to positively attach or detach from the ISOFIX bar 40 with or without the support of a spring force. In another embodiment, the cap 22 can be hinged to the cover member 20 to provide closure to the openings 21L, 21R. Alternatively, the cap 22 can be slidable into and out of a storage area to provide closure to the openings 21L, 21R.

While the cover member 20 is shown as a thermoplastic polyurethane material that can be laminated onto the flexible material backing 71, the cover member 20 can be configured differently and remain within the spirit and scope of the presently disclosed subject matter. For example, the cover member 20 can be a single integral one piece plastic structure that is adhered to the flexible material backing 71 by welding or adhesive or even by separate fastener members. The cover member 20 is not necessarily a single piece structure, but can include multiple sections connected together to form the cover member 20. A separate material can be placed over the cover member 20. For example, a leather or fabric material can be adhered or otherwise connected to the cover member 20 to provide a desired finish for the vehicle seat 10. Any of the components can be sewn together or adhered or fastened to each other before assembly of the vehicle seat 10 to facilitate the manufacturing process for the vehicle seat 10.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A vehicle seat structure for use with a vehicle seat that includes a vehicle seat bottom portion, a vehicle seat back portion, a trim portion located between the vehicle seat bottom portion and the vehicle seat back portion, and a left ISOFIX bar and a right ISOFIX bar located at the trim portion, the vehicle seat structure comprising:
   a flexible material trim cover configured to extend from a left side of the vehicle seat to a right side of the vehicle seat, the flexible material trim cover including a left side opening configured to be located at a left side of the vehicle seat and a right side opening configured to be located at a right side of the vehicle seat, the left side opening configured to allow the left ISOFIX bar to pass therethrough and the right side opening configured to allow the right ISOFIX bar to pass therethrough,
   a one-piece integrally molded member integrally overmolded onto the flexible material trim cover, the integrally molded member including a left pocket indent located at the left side opening of the flexible material trim cover and a right pocket indent located at the right side opening of the flexible material trim cover, the left pocket indent including a slot configured to allow the left ISOFIX bar to pass therethrough and be exposed in the left pocket indent and the right pocket indent including a slot configured to allow the right ISOFIX bar to pass therethrough and be exposed in the right pocket indent.

2. The vehicle seat structure according to claim 1, wherein the flexible material trim cover is a fabric cover.

3. The vehicle seat structure according to claim 1, further comprising:
   a seat bottom cover, wherein the flexible material trim cover is sewn to the seat bottom cover such that the flexible material trim cover extends across a width of the seat bottom cover.

4. The vehicle seat structure according to claim 1, further comprising:
   a left cover cap configured to selectively cover and uncover the left pocket indent, the left cover cap including a lock structure extending from a rear surface of the left cover cap and configured to selectively engage the left ISOFIX bar in order to secure the left cover cap over the left pocket indent and to cover the left ISOFIX bar, the left cover cap uncovers the left pocket indent and exposes the left ISOFIX bar when the left cover cap is disengaged from the left ISOFIX bar; and
   a right cover cap configured to selectively cover and uncover the right pocket indent, the right cover cap including a lock structure extending from a rear surface of the right cover cap and configured to selectively engage the right ISOFIX bar in order to secure the right cover cap over the right pocket indent and to cover the right ISOFIX bar, the right cover cap uncovers the right pocket indent and exposes the right ISOFIX bar when the right cover cap is disengaged from the right ISOFIX bar.

5. The vehicle seat structure according to claim 1, wherein the one-piece integrally molded member is at least one of:
   a thermoplastic polyurethane integrally heat overmolded onto the flexible material trim cover; and
   a thermoplastic polyurethane integrally vacuum overmolded onto the flexible material trim cover.

6. The vehicle seat structure according to claim 1, wherein the flexible material trim cover is a carpet.

7. The vehicle seat structure according to claim 1, further comprising:
   a left cover cap, wherein the left pocket indent defines an opening in which the ISOFIX bar is viewable when assembled, and an annular rim extends around a periphery of the opening, and the left cover cap is configured to sit within the annular rim such that a top surface of the left cover cap forms a contiguous top surface with the one-piece integrally molded member, and a rear surface of the left cover cap is supported by the annular rim of the integrally molded member.

8. A vehicle seat structure for use with a vehicle, the vehicle seat structure comprising:
   vehicle seat bottom portion;
   a vehicle seat back portion;
   a trim portion located between the vehicle seat bottom portion and the vehicle seat back portion; and
   a left ISOFIX bar and a right ISOFIX bar located at the trim portion, wherein
   the trim portion includes a flexible material trim cover extending from a left side of the trim portion to a right side of the trim portion, the flexible material trim cover including a left opening located at a left side of the vehicle seat trim portion and a right opening located at a right side of the vehicle seat trim portion, the left opening including the left ISOFIX bar passing therethrough and the right opening including the right ISOFIX bar passing therethrough,
a one-piece integrally molded member connected to the flexible material trim cover, the integrally molded member including a left pocket indent located at the left opening of the flexible material trim cover and a right pocket indent located at the right opening of the flexible material trim cover, the left pocket indent including a slot through which the left ISOFIX bar passes and the right pocket indent including a slot through which the right ISOFIX bar passes, the left ISOFIX bar is exposed in the left pocket indent and the right ISOFIX bar is exposed in the right pocket indent.

9. The vehicle seat structure according to claim 8, wherein the flexible material trim cover is a fabric cover.

10. The vehicle seat structure according to claim 8, further comprising:
a seat bottom cover, wherein the flexible material trim cover is sewn to the seat bottom cover such that the flexible material trim cover extends across a width of the seat bottom cover.

11. The vehicle seat structure according to claim 8, further comprising:
a left cover cap configured to selectively cover and uncover the left pocket indent, the left cover cap including a lock structure extending from a rear surface of the left cover cap and configured to selectively engage the left ISOFIX bar in order to secure the left cover cap over the left pocket indent and to cover the left ISOFIX bar, the left cover cap uncovers the left pocket indent and exposes the left ISOFIX bar when the left cover cap is disengaged from the left ISOFIX bar; and
a right cover cap configured to selectively cover and uncover the right pocket indent, the right cover cap including a lock structure extending from a rear surface of the right cover cap and configured to selectively engage the right ISOFIX bar in order to secure the right cover cap over the right pocket indent and to cover the right ISOFIX bar, the right cover cap uncovers the right pocket indent and exposes the right ISOFIX bar when the right cover cap is disengaged from the right ISOFIX bar.

12. The vehicle seat structure according to claim 8, wherein the one-piece integrally molded member is at least one of:
a thermoplastic polyurethane integrally heat overmolded onto the flexible material trim cover; and
a thermoplastic polyurethane integrally vacuum overmolded onto the flexible material trim cover.

13. The vehicle seat structure according to claim 8, wherein the flexible material trim cover is a carpet.

14. The vehicle seat structure according to claim 8, further comprising:
a left cover cap, wherein the left pocket indent defines an opening in which the ISOFIX bar is viewable when assembled, and an annular rim extends around a periphery of the opening, and the left cover cap is configured to sit within the annular rim such that a top surface of the left cover cap forms a contiguous top surface with the one-piece integrally molded member, and a rear surface of the left cover cap is supported by the annular rim of the integrally molded member.

15. A method for manufacturing the vehicle seat structure according to claim 8, comprising:
overmolding the one-piece integrally molded member onto the flexible material trim cover.

16. A vehicle seat structure including a vehicle seat bottom portion and a vehicle seat back portion, for use with a vehicle, the vehicle seat structure comprising:
a left ISOFIX bar and a right ISOFIX bar;
a flexible material trim cover extending from the left ISOFIX bar to the right ISOFIX bar and including a left side opening through which the left ISOFIX bar passes and a right side opening through which the right ISOFIX bar passes;
a rigid cover member connected to the flexible material trim cover, the rigid cover member including a left concave portion located at one end of the rigid cover member and a right concave portion located at an opposite end of the rigid cover member, and a planar face extending between the left concave portion and right concave portion and along a longitudinal axis of the rigid cover member, the planar face having a front surface and an opposed rear surface, the left concave portion extending away from the rear surface of the rigid cover member and located at the left opening of the flexible material trim cover, and the right concave portion extending away from the rear surface of the rigid cover member and located at the right opening of the flexible material trim cover, the left concave portion including an opening through which the left ISOFIX bar passes and the right concave portion including an opening through which the right ISOFIX bar passes.

17. The vehicle seat structure according to claim 16, wherein the flexible material trim cover is a fabric cover.

18. The vehicle seat structure according to claim 16, further comprising:
a seat bottom cover, wherein the flexible material trim cover is sewn to the seat bottom cover such that the flexible material trim cover extends across a width of the seat bottom cover.

19. The vehicle seat structure according to claim 16, further comprising:
a left cover cap configured to cover the left concave portion, the left cover cap including a lock structure extending from a rear surface of the left cover cap and configured to engage the left ISOFIX bar in order to secure the left cover cap over the left concave portion such that a front surface of the left cover cap is coplanar with the front surface of the rigid cover member; and
a right cover cap configured to cover the right concave portion, the right cover cap including a lock structure extending from a rear surface of the right cover cap and configured to engage the right ISOFIX bar in order to secure the right cover cap over the right concave portion such that a front surface of the right cover cap is coplanar with the front surface of the rigid cover member.

20. The vehicle seat structure according to claim 16, wherein the rigid cover member is a one-piece integrally molded member including a thermoplastic polyurethane integrally overmolded onto the flexible material trim cover.

* * * * *